UNITED STATES PATENT OFFICE.

JOHN MURPHY, OF NEW YORK, N. Y.

IMPROVEMENT IN THE MANUFACTURE OF INDIA-RUBBER AND GUTTA-PERCHA GOODS.

Specification forming part of Letters Patent No. 99,935, dated February 15, 1870.

*To all whom it may concern:*

Be it known that I, JOHN MURPHY, of the city, county, and State of New York, have made a new and useful Improvement in the Manufacture of India-Rubber Goods, and those of Gutta-Percha; and I hereby declare the following to be a full and exact description of the same.

Rubber goods, both vulcanized and not vulcanized, undergo after manufacture a slow decay or disintegration, whereby their freshness or elasticity is greatly impaired, and sometimes in a few years they are totally destroyed. This is shown in the decay of all the samples of manufactured soft-rubber goods.

The object of my invention is to prevent this decay and disintegration. The exact cause of this decay is not well known. It has been attributed to the slow oxidation of the rubber itself. After a series of experiments I have discovered that by the incorporation of phenol or carbolic acid with the rubber or gutta-percha before or during the process of manufacture, or after vulcanization by immersion in the acid, this decay or disintegration is prevented, and the goods produced rendered far more durable. Any other suitable mode of incorporating the phenol with the rubber may be used.

The exact amount of carbolic acid used is not material, since various proportions will answer, and the amount will depend somewhat upon the degree of exposure to which the goods are to be subjected.

This invention is especially applicable in the manufacture of the various kinds of elastic cloth, woven fabrics, clothing, hollow ware, belting, packing, hose, and similar goods, in which the elastic compounds of rubber or gutta-percha or allied gums are employed.

A suitable proportion in which to employ the carbolic acid, in most cases, is one ounce of carbolic acid to one pound of rubber or gutta-percha, or the combinations of these or other gums.

Instead of phenol or carbolic acid, the nearly allied compounds cresol, rosol, &c., known also as cressylic acid, rossolic acid, &c., may be employed. These compounds have been known many years for their highly preservative power, but are little used in manufactures, probably for the reason that it is only within the last few years that their preparation has been conducted on a commercial scale. The mode of preparing these compounds need not be given, since it has been set forth in the writings of Calvert and others; and the compounds may be obtained in the market or prepared by the known process.

I am well aware that coal-tar, dead-oil, and similar crude products from which carbolic acid and other related compounds may be obtained, have been combined with india-rubber and gutta-percha; but the presence of tar, pitch, and bituminous matter, together with pyroligneous acid and similar corrosive materials, have made the compounds so objectionable as not to be used except for very inferior goods.

The application of phenol and the other compounds above mentioned to elastic fabrics does not render the goods offensive, but preserves them, and makes them incapable of carrying any contagious disease.

Having thus described my invention, what I claim, and desire to secure by Letters Patent of the United States, is—

The combination of carbolic acid or its equivalents with india-rubber or other elastic fabrics, so as to preserve the same, substantially as above set forth.

JOHN MURPHY. [L. S.]

Witnesses:
 JUNIUS SCHENCK,
 A. C. BENEDICT, Jr.